F. W. L. PEEBLES.
LOCK.
APPLICATION FILED DEC. 7, 1916
1,377,625.
Patented May 10, 1921.
2 SHEETS—SHEET 2.
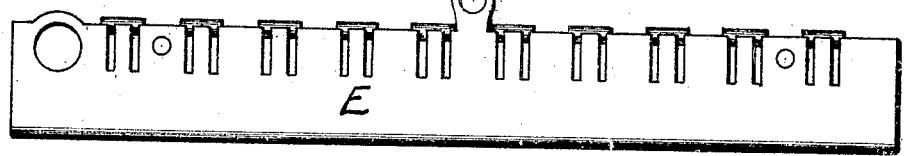
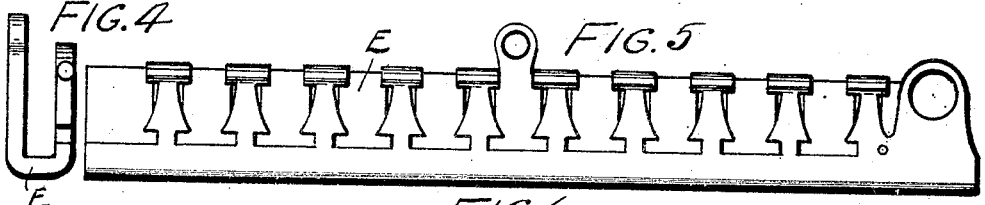
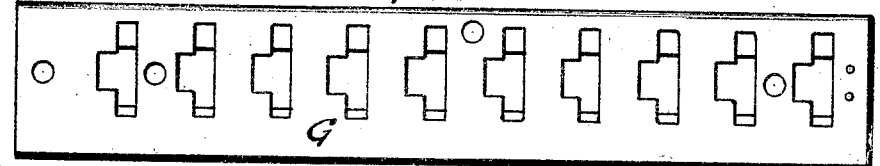
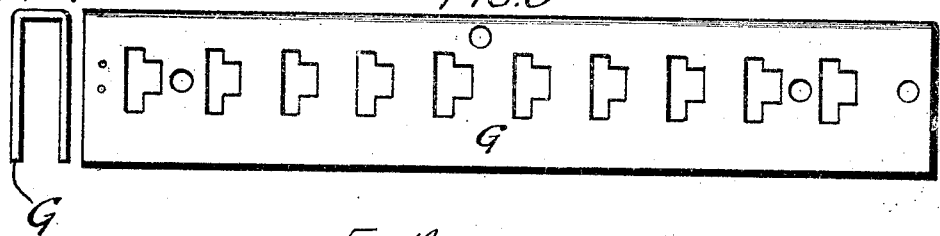
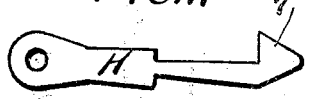
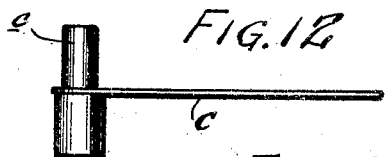
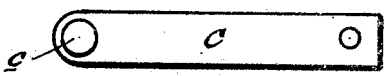
Inventor
Frank W. L. Peebles
By F. M. Cornwall, Atty.

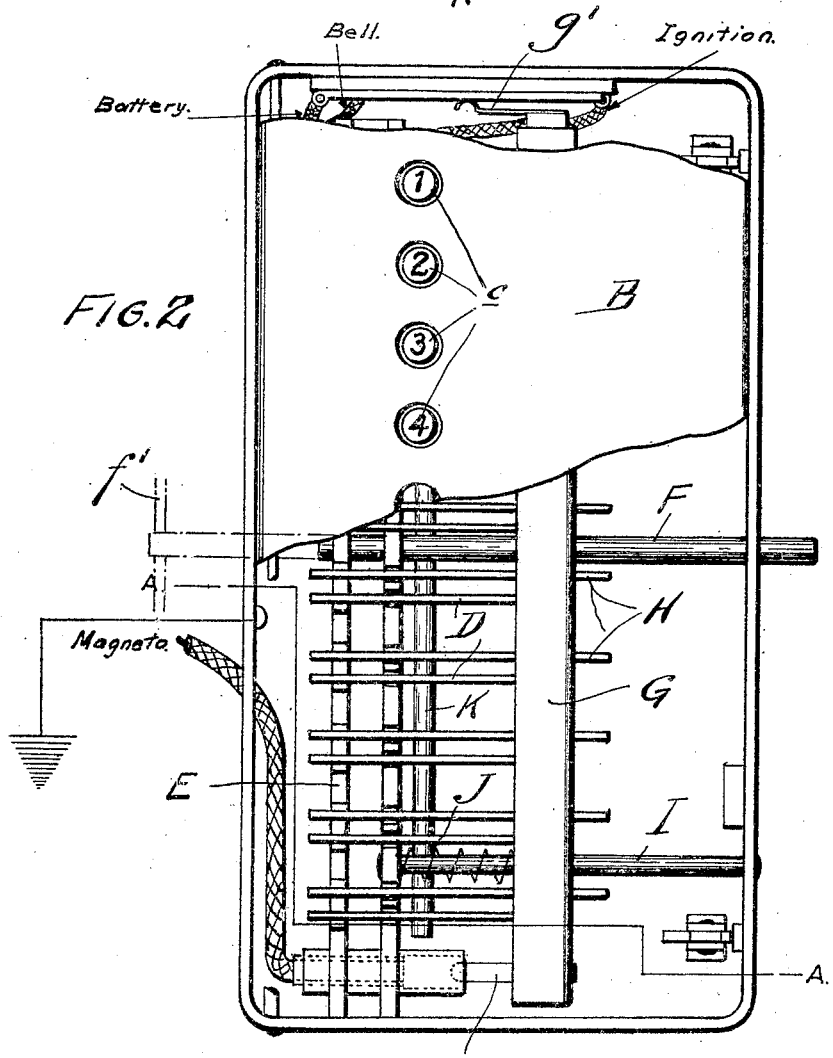

UNITED STATES PATENT OFFICE.

FRANK W. L. PEEBLES, OF ST. LOUIS, MISSOURI, ASSIGNOR TO LEO EHRLICH, OF ST. LOUIS, MISSOURI.

LOCK.

1,377,625.  Specification of Letters Patent.  Patented May 10, 1921.

Application filed December 7, 1916. Serial No. 135,567.

*To all whom it may concern:*

Be it known that I, FRANK W. L. PEEBLES, a citizen of the United States, residing at the city of St. Louis, State of Missouri, have invented a certain new and useful Improvement in Locks, of which the following is a full, clear, and exact description, such as will enable others skilled in the art to which it appertains to make and use the same, reference being had to the accompanying drawings, forming part of this specification, in which—

Figure 1 is a cross sectional view through my improved lock.

Fig. 2 is a top plan view with the cover partly removed to show the interior mechanism.

Fig. 3 is a front elevational view of the mount for the dogs or tumblers.

Fig. 4 is an end elevational view of the same.

Fig. 5 is a rear elevational view of the same.

Fig. 6 is a front elevational view of the keeper plate carried by the latch or bolt.

Fig. 7 is an end elevational view of the same.

Fig. 8 is a front elevational view of the same.

Fig. 9 is a detail view of one of the locking dogs or tumblers.

Fig. 10 is a detail view of the latch dog for locking the cover in place.

Fig. 11 is a detail view of one of the companion dogs or tumblers.

Fig. 12 is a side elevational view of one of the keys and its connected spring for operating the dogs or tumblers.

Fig. 13 is a plan view of the same.

This invention relates to a new and useful improvement in locks for automobiles and the like, the object being to control the ignition system of an automobile, or the like, whereby when the lock is set the ignition circuit is broken and if a uninformed or unauthorized person attempts to open the lock an alarm will be sounded. My invention is designed particularly as an improvement upon the invention disclosed in United States Letters Patent No. 1,139,757 issued to Francis K. Fassett, under date of May 18, 1915. Specifically, my invention provides a mechanical switch for disabling the ignition system, said switch being controlled by a lock which is manually operated when it is closed, which lock requires the operation of certain tumblers, locking dogs or pawls to be opened. If an improper tumbler is operated an alarm will be sounded. By providing a series of reversible dogs or tumblers, the combination of the lock may be changed at will. My improved lock may also be used for locking various other parts of an automobile.

Referring now to the structure shown in Figs. 1 to 13 inclusive, A. indicates a housing in which is pivotally mounted the cover B. having a keeper projection $b$. $c$. indicates a series of push buttons or keys each of which is mounted upon a flat spring carrier C. (see Figs. 12 and 13) supported by the underside of the cover B. These push buttons coöperate with the shanks of tumblers or dogs D. pivoted to the rear leg of the U-shaped supporting strip E, said tumblers being held upwardly by means of springs $e$. The forward legs of the U-shaped supporting strip E. are slotted so as to guide the dogs or tumblers D, in their vertical movement (see Fig. 3). The dogs D. are formed with upward extensions $d$. which lie in front of the lower ends of the push buttons $c$., the forward ends of said dogs having shoulders constituting hooks $d'$. F. is a bolt guided at its forward end through a hole in the casing A. and at its rear end by openings in the U-shaped strip E. The bolt F. carries a universal bar G. which is inverted U-shape, the forward leg being provided with series of openings such as shown in Fig. 8, while the rear leg is provided with a series of openings, such as shown in Fig. 6. The hooked ends of dogs D. coöperate with shoulders in the rear leg, while the hooked ends $h'$ of companion dogs H. coöperate with the shoulders in the openings in the front legs. These dogs D. and H. are capable of being reversed so that their hooked ends may be presented to engage or not to engage with the bar G. Bar G. is guided at its ends by bars I., the same being arranged parallel with the ends of the housing A. and seated in the walls thereof and in the strip E., bar G. being pressed forward by springs J. interposed therebetween and the forward legs of the bar E.

The operation of my improved lock as above described is as follows: Each button

*c.* when depressed operates a dog D. and a dog H. If there are ten sets of companion dogs and all are positioned with their hooks presented upwardly, then all of the buttons will have to be depressed to actuate all the dogs and release the universal bar G. To avoid this and permit the employment of various combinations, I reverse the position of some of the dogs D. and H. so that their hooks will be presented downwardly. Assuming that the buttons marked 1, 3, 5, and 7, control those dogs having their hooks presented upwardly and that all of the remaining dogs have their hooks presented downwardly, it follows that when buttons 1, 3, 5, and 7 are operated and the corresponding dogs are depressed, the universal bar G. will be released by these dogs; and that if any other dog is depressed, either alone or in conjunction with those operated by the buttons of the correct combination, the improperly operated dog will engage the lower edge of the opening in the universal bar G, and prevent the forward movement of the bolt. At the same time the extension *d* of the improperly operated dog will contact with the bar K. and complete a circuit containing an alarm bell. The hooked ends of dogs H. are located in front of the front leg of the universal bar G. and pass through openings which will not retard the movement of the bolt unless a button is erroneously depressed. The purpose of making the universal bar G. of inverted U-shape is to give it strength and the hooks on the dogs H. merely serve as stops to limit the forward movement of the universal bar by the engagement of said hooks with the rear leg of the universal bar.

One end of the universal bar carries a contact *g.* fitting into a plug or socket to interrupt the magneto circuit whenever the bar is in its rearward position, the bolt F. being pressed rearwardly by the operator for this purpose. Bolt F. may have a projection *f.* extending through a slot in cover B., as shown in Fig. 1, to enable the manual retraction of the bolt in the event that the rear end of the bolt is extended through the casing, as shown by dotted lines in Fig. 2, to engage a movable plate *f'* or like movable member and lock the same against movement.

To enable the cover B. to be lifted and the dogs D. and H. reversed, to change the combination, the proper buttons C. are pressed to operate the dogs H. and permit of further forward movement of the universal bar G whereby the latching lever N. engaging the keeper projection on the cover, will be operated by the universal bar to release the cover. Assuming that dogs H. operated by buttons marked 2, 4, 6, and 8, are presented upwardly and the remaining dogs H. are presented downwardly, it will be obvious that when the buttons 1, 3, 5, and 7 are operated to permit the forward movement of the universal bar, that the dogs H. identified with the buttons 2, 4, 6, and 8 will serve as stops to arrest the forward movement of the universal bar; and that if, in this position of the parts, buttons 2, 4, 6, and 8 are operated, the universal bar will be released and continue its forward movement until it contacts with the latch lever N. and releases the cover B. The remaining dogs H., if improperly operated, either independently or in conjunction with their companion dog identified with the buttons 2, 4, 6, and 8, will of course prevent this extra forward movement of the universal bar. This double combination thus enables the owner of an automobile to impart the knowledge of the combination to a chauffeur, or other authorized person, whereby the bolt F. and other connected movable parts may be operated to make and break certain electrical connections, and give access to the reversible dogs, whereby this combination may be preserved by the person having the correct combination to open the lock.

In the accompanying drawings, I have shown the front leg of the universal bar G. as having vertically elongated openings so that the dogs H. will coöperate only with the rear leg as a stop and to provide means for releasing the universal bar to open the swinging cover or lid of the casing. With the ten buttons and their operated dogs or tumblers D. over a thousand combinations are possible to control the operation of the movable element or bolt F. The ten dogs or tumblers H. provide an equal number of combinations for controlling the opening of the lock and said dogs H. in conjunction with the dogs D. provide many hundreds of thousands of combinations for controlling the operation of the universal bar.

Various modifications might be made in the structure without departing from the broad principles of my invention. Moreover, the principles disclosed might be employed in various other fields. For example, I have shown two movable members, the bolt and the keeper which are adapted to be locked against movement, and a single set of keys whereby said members may be released. It is obvious that the use to which either or both of these members may be put is not limited to that disclosed in this application. I believe I am the first to disclose a combination locking mechanism whereby two independent members may be controlled by a single set of controlling devices, such as the keys or push buttons.

What I claim is:

1. A combination lock comprising a bolt, a plurality of manually operable keys, dogs, each adapted to lock the bolt against movement in one direction, said dogs being arranged in pairs and each pair operable by one of the keys, a spring for each dog, each dog capable of being adjusted so as to be actuated by its spring to lock the bolt but release it upon the operation of its key, or be adjusted so its spring will tend to prevent its locking the bolt but lock it when its key is operated, and means whereby the dogs may lock the bolt in either of two positions.

2. A combination lock inclosed in a housing, manually operable keys, certain ones of which must be operated to actuate the lock, means including latching members for rendering the lock mechanism inaccessible, which latching members are arranged in pairs and each pair operable by a single key, said latching members being divided into two groups, those of one group being normally effectual but rendered ineffectual by operating certain of the keys, the latching members of the other group being normally ineffectual but rendered effectual by other keys, and said latching members capable of being made a member of either group, the relationship between the latching members and keys being such that one or more keys may be common to the combination for actuating the lock and the combination where the latching members are rendered ineffectual.

3. A combination lock inclosed in a housing, manually operable keys, certain ones of which must be operated to actuate the lock, means including latching members for rendering the lock mechanism inaccessible, which latching members are arranged in pairs and each pair operable by a single key, said latching members being divided into two groups, those of one group being normally effectual but rendered ineffectual by operating certain of the keys, the latching members of the other group being normally ineffectual but rendered effectual by operating other keys, the relationship between the keys and the latch members being such that one or more keys may be common to the group for actuating the lock and the group whereby said latching members are rendered effectual.

4. A combination lock inclosed in a housing, manually operable keys whereby to actuate the lock, means including latching members for rendering the lock mechanism inaccessible, which latching members are arranged in pairs and each pair operable by a single key, said latching members being divided into two groups, those of one group being normally effectual but rendered ineffectual by operating certain of the keys, those of the other group being normally ineffectual but rendered effectual by operating other keys, and means whereby any latching members may be made a member of either group.

5. A combination lock inclosed in a housing, manually operable keys whereby to actuate the lock, means including latching members for rendering the lock mechanism inaccessible, which latching members are arranged in pairs and each pair operable by a single key, said latching members being divided into two groups, those of one group being normally effectual but rendered ineffectual by operating certain of the keys, the latching members of the other group being normally ineffectual but rendered effectual by operating other keys.

6. In combination, a base, a spring returned slidable bolt, reversible spring pressed latching members for locking the bolt in either of two positions, such latching members being arranged in pairs, and a manually operable member for actuating each pair of latching members.

7. In combination, a base, a spring returned slidable bolt, reversible spring pressed latching members for locking the bolt in either of its two positions, said latching members being disposed in pairs and one member of each pair being longer than the other.

8. In combination, two movable members, each adapted to be locked against movement, locking means for each, which locking means includes spring-pressed dogs arranged in pairs, both members of each pair being reversible in order to render them ineffective in performing their locking functions, and a plurality of manually operable keys whereby either or both of said locking means may be released.

9. In combination, two movable members, each adapted to be locked against movement, independent locking means for each of said members, which locking means includes spring-pressed dogs arranged in pairs, both members of each pair being reversible in order to render them ineffective in performing their locking functions, a plurality of manually operable keys whereby either or both of said locking means may be operated, and means whereby said locking means may be made to act positively or negatively when keys are operated.

10. In a lock of the class described, a bolt, two sets of pivotally mounted dogs arranged to retain said bolt in two different positions, said dogs being arranged in pairs and each pair comprising a member in each set, and manually operable means for conjointly operating the pairs of dogs.

11. In a lock of the class described, a bolt, two sets of pivotally mounted dogs arranged to retain said bolt in two different positions, said dogs being arranged in pairs and each pair comprising a member in each set, and manually operable means for actuating one or more of the pairs of dogs at a time to release the bolt.

12. In a lock of the class described, a bolt, a universal bar carried thereby, two sets of pivotally mounted locking dogs adapted to engage said universal bar to retain it in two different positions, said dogs being arranged in pairs and each pair comprising a dog in each set, and manually operable means for actuating each pair of dogs to release the bolt carrying universal bar.

In testimony whereof I hereunto affix my signature in the presence of two witnesses this 2nd day of November, 1916.

FRANK W. L. PEEBLES.

Witnesses:
M. P. SMITH,
M. A. HARDEE.